United States Patent [19]

Hehn

[11] Patent Number: 4,589,549
[45] Date of Patent: May 20, 1986

[54] AUDIO CASSETTE PACKAGE
[75] Inventor: Bruce A. Hehn, N. Canton, Ohio
[73] Assignee: Alpha Enterprises, Inc., Canton, Ohio
[21] Appl. No.: 590,717
[22] Filed: Mar. 19, 1984
[51] Int. Cl.[4] .................................................. B65D 85/672
[52] U.S. Cl. ..................................... 206/387; 70/63;
70/401; 70/408; 206/1.5
[58] Field of Search ..................... 70/58, 63, 69, 401,
70/408; 40/330; 206/1.5, 387

[56] References Cited

U.S. PATENT DOCUMENTS

| | | | |
|---|---|---|---|
| 2,293,942 | 8/1942 | Klahn | 70/63 |
| 2,672,747 | 3/1954 | Craig | 70/408 |
| 3,125,873 | 3/1964 | Robinson | 70/63 |
| 3,722,236 | 3/1973 | Zelenko | 70/78 |
| 3,828,922 | 8/1974 | Holkestad | 206/387 |
| 3,871,516 | 3/1975 | Holkestad et al. | |
| 3,933,240 | 1/1976 | Humble | 206/1.5 |
| 4,243,142 | 1/1981 | Foreman | 206/387 |
| 4,245,741 | 1/1981 | Holkestad | |
| 4,285,429 | 8/1981 | MacTavish | 206/387 |
| 4,361,233 | 11/1982 | Holkestad | |
| 4,466,540 | 8/1984 | Lotrous et al. | 206/387 |

FOREIGN PATENT DOCUMENTS

2801567 7/1979 Fed. Rep. of Germany .

Primary Examiner—William Price
Assistant Examiner—Jimmy G. Foster
Attorney, Agent, or Firm—Sand & Hudak Co.

[57] ABSTRACT

A reusable molded plastic package for holding audio cassettes which enables the cassettes to be stored and displayed in racks heretofore used for record discs and eight-track audio tapes and which includes a slide lock which secures the cassette in the package preventing its unauthorized removal therefrom. In one embodiment, the cassette is mounted in a transverse position at one end of the package enabling the contents of the cassette to be viewed from the end of the package when stored in a horizontal position. In another embodiment, the cassette is mounted in a longitudinal position at one end of the cassette whereby the contents can be read from the front of the cassette when stored in a vertical position. In still another embodiment the package can store either an audio cassette or a compact disc. The slide lock is retracted from its locked position by a manually operated key. The key engages camming surfaces formed on the swinging ends of a pair of locking levers formed on the slide lock enabling the levers to be moved from their locked position with a pair of angled projections formed on the interior of the housing.

31 Claims, 21 Drawing Figures

AUDIO CASSETTE PACKAGE

TECHNICAL FIELD

The invention relates to packages and particularly to a package for holding an audio cassette. More particularly the invention relates to a reusable audio cassette package having a slide lock which prevents unauthorized removal of the cassette from the package and in which the improved package may be displayed horizontally in a usual 8-track cassette case or vertically in a usual L.P. record disc display rack. Furthermore, a compact audio disc may be stored in the improved package.

BACKGROUND ART

In recent years, audio cassettes have become increasingly popular and are approaching outselling usual L.P. record disc sale and are considerably more popular than the 8-track audio tapes. The introduction of these cassettes into the audio market presented a problem to the retail sellers in that the cassettes, which are considerably smaller than the 8-track tapes and records discs, had to be displayed so that prospective purchasers could inspect the same to determine the artist, songs, etc. on the cassettes. This presents a security problem due to the extremely small size of the cassettes in contrast to the heretofore record discs and 8-track tapes.

Existing record discs are placed on their edges and displayed in racks since theft of the discs is extremely difficult due to their large size, generally 12"×12". One popular means of storing and displaying 8-track tapes is to place the same in a storage cabinet having a plastic or glass front that is provided with a circular opening through which a prospective purchaser can insert his or her hand and remove an 8-track tape from a horizontal storage shelf and inspect the same through the glass as to the recording artist and particular songs on the tape. The size of the opening in the transparent panel is too small to permit the 8-track tape from being removed through the opening, and it requires an attendant to unlock and open the storage cabinet for final sales.

The small size of the cassette makes such methods of display difficult from a security standpoint since the circular opening in the display rack has to be sufficiently large to enable a prospective buyer to place a hand through the opening for manipulation of the cassette. This opening would be large enough for the cassette to be removed through the opening. Also open rack display of cassettes in a similar manner as record discs would be extremely vulnerable to theft problems. Therefore, various packaging arrangements have been devised which enable the audio cassettes to be displayed for sale yet displayed vertically in usual record disc display racks and horizontally in usual 8-track tape cases.

One type of cassette storage and display package is an elongated, rectangular-shaped cardboard box having a height of 12 inches which enables the package to be placed in a usual record disc rack. An opening formed in an upper portion of the box enables the printed material on the cassette to be read by a prospective purchaser. This entire box and cassette is wrapped in a clear plastic heat-shrink paper. This enables the cassettes to be stored in a record disc cabinet and permits a prospective purchaser to read the contents of the tape through the clear window formed by the box opening. Another cassette package is formed of a cardboard box and has the size of an 8-track tape. The audio cassette is contained in an upper section of the box with the printed material being visible through a window formed in the box. Again, the entire package is wrapped in a heat-shrink plastic paper. This enables the cassettes to be placed in an 8-track tape storage cabinet having the circular access opening, yet due to the size of the cassette box simulating that of the 8-track tape, the same cannot be removed from the cabinet by an individual without assistance from the sales clerk.

There are various cassette packages formed of molded plastic which enable the cassette to be stored either in a record disc display rack or in an 8-track tape storage and display cabinet. One such type of molded plastic package has a bar like member which is removably mounted on a main housing by a dovetail connection. A metal key is insertable into the housing and bar for removing the bar from the housing to permit the cassette to be placed in the housing for display and subsequently removed when sold. These types of units are relatively expensive and the bar and metal key can easily become separate from the package and lost.

Still another type of plastic molded cassette package used today has a hinged lower portion which when moved to a closed position will trap and hold either a single 8-track tape or a pair of cassettes in the closed package. This storage package is not reusable because the retaining walls or cross members of the package must be cut to remove the cassette since the unit, when in closed position, has interlocking tabs and bars which prevent easy opening of the package without partially destroying the package.

Although these known packages do perform their intended functions, they have several disadvantages. The cardboard packages must be wrapped in a heat-shrink paper after the cassette has been placed in the box which requires the record distributor or retailer to purchase a heat-shrink wrapping machine and manually wrap and package each cassette. The reusable, plastic molded type of packages having the key-actuated removable bar are relatively expensive due to the intricate molding operations required to form the dovetail engagement of the locking bar with the remaining housing. Also, the type of package having the pivotally mounted closure portion for entrapping the cassette can only be used once due to the necessity to cut the retaining member to remove the cassette from the unit. Likewise, such packages have several component parts which increase the molding cost of the package.

Another recent development in the audio industry is the compact disc digital audio system. In this system, the sound is reproduced on a small convenient sound-carrier unit. The disc is approximately 4½ inches in diameter and produces a unique combination of digital playback with laser optics. These compact discs, as they are referred to in the audio industry, are starting to find acceptance in the United States and in certain foreign countries. Therefore, the need is arising for a package for storing and displaying these discs.

These discs, due to their relatively small size, have the same theft problems and display problems discussed above with respect to the usual audio cassette. These compact discs are currently packaged in a plastic box and have a circular recessed holder in one-half of the box with a top half that is pivotally mounted on the bottom half and serving as a closure for the box. Although these existing packages are satisfactory, they are relatively expensive and do not eliminate the theft and storage problems.

Therefore, the need has existed for an improved cassette package which can be used either in the usual 8-track tape storage racks or in the record disc storage racks, and which can be produced inexpensively yet is sufficiently strong and durable so as to be reusable. It is also desirable that such a cassette package be adaptable for use as a storage package for compact audio discs. There is no known audio cassette package of which I am aware which provides these features and advantages.

DISCLOSURE OF THE INVENTION

Objectives of the invention include providing an improved audio cassette package which can be mass produced relatively inexpensive as a two-piece molded plastic member, one piece of which forms the main housing and the other piece being a locking plate slidably mounted on the housing for securing a cassette in the housing, and which can be manually loaded by the retail shop owners and without heat-shrink wrapping of the package after the cassette is placed therein. Another objective is to provide such a package in which the printed information on the cassette is visible through enlarged openings formed in the front and back walls of the housing which forms the package, and in which a cassette is slid easily into a storage compartment formed in the housing and secured therein by the easily operated manual slide lock to prevent unauthorized removal of the cassette from the package.

A further objective is to provide such an improved package in which an inexpensive key formed of molded plastic is insertable into openings formed in the housing whereby the slide lock can be moved to an unlocked position permitting the cassette to be manually removed from its storage compartment upon completion of a sale enabling the package to be reused for storing another cassette. A still further objective is to provide such a package which can be molded of rugged plastic material and reused thereby reducing the cost to a manufacturer and/or distributor of the cassettes.

Another objective of the invention is to provide such a package in which the housing has an exterior size and configuration which enables the cassette to be stored either horizontally in a display case heretofore used for 8-track units enabling the contents of the cassette to be viewed through an end opening in the housing, or which can be displayed in a usual L.P. record display case enabling the purchasers to leaf through a plurality of cassette packages and inspect the contents of the individual cassettes in their packages through openings formed in either or both the front and back walls of the housing. Another objective is to provide such a package in which the size of the housing can be increased from a nominal width of four inches to six inches whereby an end of the housing opposite from the cassette storage end can be adapted for storing a compact audio disc therein which also will be locked in its stored position by the slide lock mechanism which is used for locking the audio cassette in the opposite housing end.

A still further objective is to provide such an improved audio cassette package in which the manually operated unlocking key can be mounted on a base provided with guides, whereby a package when placed on the base is automatically unlocked enabling a salesclerk to retract the locking slide after which a spring mounted in the base automatically ejects the cassette from its storage compartment. A still further objective is to provide such an audio cassette package which is of an extremely simple construction, which achieves the stated objectives in a simple, effective and inexpensive manner, and which solves problems and satisfies needs in the art.

These and other objectives and advantages are obtained by the improved package construction for holding an audio cassette, the general nature of which may be stated as including an integral one-piece plastic housing having a cassette storage compartment formed therein; lock means slidably mounted on the housing and movable between locked and unlocked positions for releasably securing a cassette in the compartment; and separate key means for unlocking the lock means enabling it to be moved from the locked position to an unlocked position for removing a cassette from the compartment.

BRIEF DESCRIPTION OF THE DRAWINGS

Preferred embodiments of the invention, illustrative of the best modes in which applicant has contemplated applying the principles, are set forth in the following description and shown in the drawings, and are particularly and distinctly pointed out and set forth in the appended claims.

FIG. 3;

Similar numerals refer to similar parts throughout the drawings.

BEST MODE FOR CARRYING OUT THE INVENTION

Figure 2:
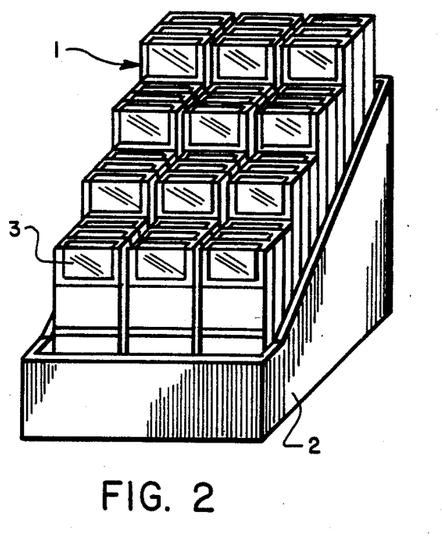
FIG. 2 is a diagrammatic perspective view showing a plurality of a modified cassette package on display in a vertical position in a rack heretofore used for record discs.

One form of the improved audio cassette package is indicated generally at 1, and is shown particularly in FIGS. 3–6. A plurality of packages 1 are shown in FIG. 2 placed in a display and storage cabinet 2 of the type heretofore used for LP record discs. The overall longitudinal length of package 1 preferably is 12 inches. This corresponds in length to the usual size of a record disc jacket. This enables a plurality of cassettes 3, each of which is contained in an individual package 1, to be stored and displayed in a usual LP record disc display rack 2 as shown in FIG. 2. This enables a prospective purchaser to look through a plurality of audio cassettes stored in the rack and easily see the contents of the cassette through an opening formed in the package described in greater detail below.

Package 1 is formed as a one-piece molded plastic unit preferably molded of high impact polystyrene. It has an elongated generally rectangular configuration with a length of 12 inches, a width of 4 inches and a depth of approximately 0.8 inches. Package 1 includes a housing indicated generally at 5, formed by a pair of end walls 6 and 7 and a pair of spaced side walls 8 and 9. A cassette storage compartment indicated generally at 11, is formed at one end of housing 5 by end wall 6 and a pair of half-wall members 12 and 13 which are formed on a partial bottom wall 14 and extend parallel to and are spaced from side walls 8 and 9, respectively. A top flange 15 is formed integrally with end wall 6 and projects inwardly therefrom which serves as a retaining lip for the outer upper edge of a cassette when inserted therein. A cutout 16 is formed in the portion of bottom wall 14 which forms compartment 11 which enables the contents of the cassette mounted in compartment 11 to be viewed from the back thereof by a prospective purchaser without removing the cassette from package 1. The opposite end of package 1 is formed with a large rectangular opening 17 by another fragmentary bottom wall portion 18. This configuration reduces the amount of plastic required for the forming of package 1 while providing the desired package length for proper storage and display of a cassette stored therein for the reasons set forth above. Storage compartment 11 has a length of approximately 4.25 inches and a width of 2.8 inches which is complementary to the size of a usual audio cassette. The longitudinal axis of a cassette 3 when mounted in package 1 aligns with the longitudinal axis of the cassette as shown by dot-dash line 10 in FIG. 3.

Figure 1:
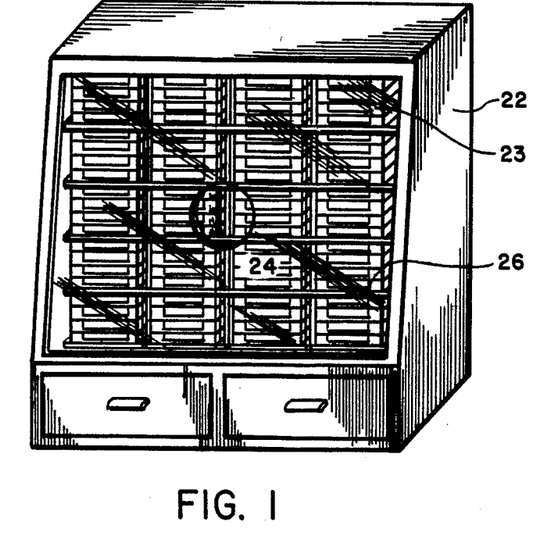
FIG. 1 is a diagrammatic perspective view showing a plurality of the improved cassette packages displayed in a horizontal position in a display case.
Figure 7:
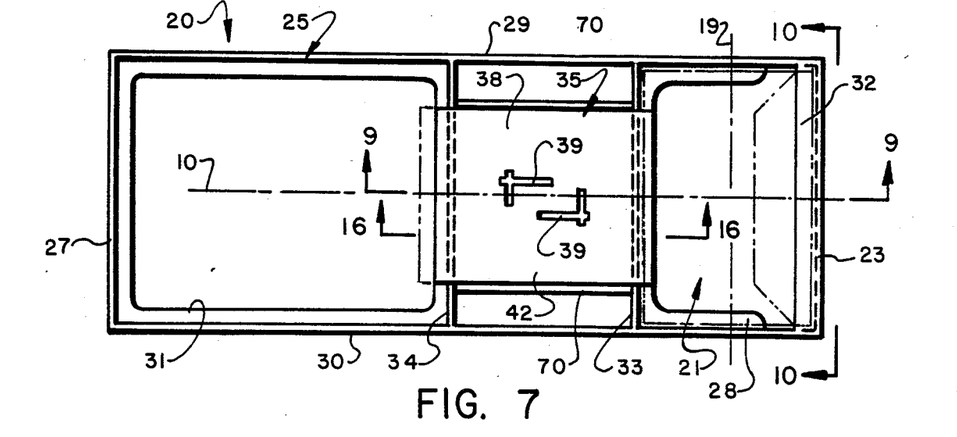
FIG. 7 is a top plan view of the cassette package of the type shown in FIG. 1, removed from the storage case with the slide lock being shown in full line locked position securing a cassette in the storage compartments.
Figure 8:
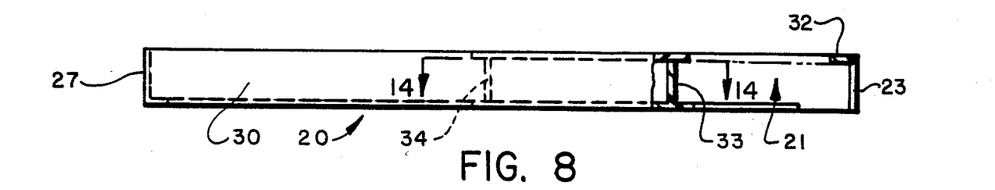
FIG. 8 is a side elevational view with portions broken away and in section of the cassette package shown in FIG. 7.
Figure 9:
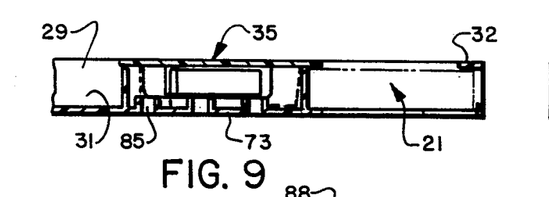
FIG. 9 is a fragmentary sectional view taken on line 9—9, FIG. 7.
Figure 10:
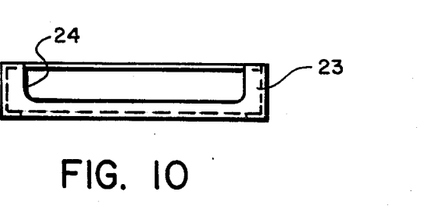
FIG. 10 is an end elevational view looking in the direction of arrows 10—10, FIG. 7.

A modified form of cassette package 1 is indicated generally at 20, and is shown particularly in FIGS. 7–10. Cassette package 20 is very similar to that of package 1 except that it has a width of 4.5 inches instead of the 4.0 inch width of cassette 1. This increased width enables a cassette to be stored in a storage compartment 21 formed at one end of the package so that its longitudinal axis 19 is transverse to the longitudinal axis 10 of package 20 as shown in FIG. 7. This arrangement is desirable when storing cassettes in a display and storage cabinet 22 of the type as shown in FIG. 1 heretofore used for 8-track tapes. Cabinet 22 has a glass front 23 and is formed with a circular hole 24 through which a prospective purchaser will insert his or her hand and remove one of the cassettes from its stored position on a horizontal storage shelf for inspection of the printed material on the cassette which indicates the particular artist and songs recorded thereon. The diameter of front opening 24 is of a predetermined size which permits maximum freedom of movement of a purchaser's hand when inserted through the opening yet will not permit the removal of the package 20 therefrom. End wall 23 of package 20 is formed with an opening 24 enabling the printing on the edge of the cassette to be viewed therethrough enabling the purchaser to view the same through glass front 23 without removing the cassette from its horizontal storage shelf 26.

The remaining portions of cassette package 20 are similar to that of package 1 and include a housing 25 formed by an end wall 27 opposite of end wall 23, a bottom wall 28 and spaced side walls 29 and 30. An enlarged opening 31 is formed in the other end of package 20 opposite of storage compartment 21. Storage compartment 21 has a cassette retaining flange 32 similar to flange 15 of cassette 1 and includes a pair of spaced transversely extending walls 33 and 34. Transverse wall 33, end wall 23 together with portions of side walls 29 and 30 and a portion of bottom wall 28 form storage compartment 21.

Figure 11:
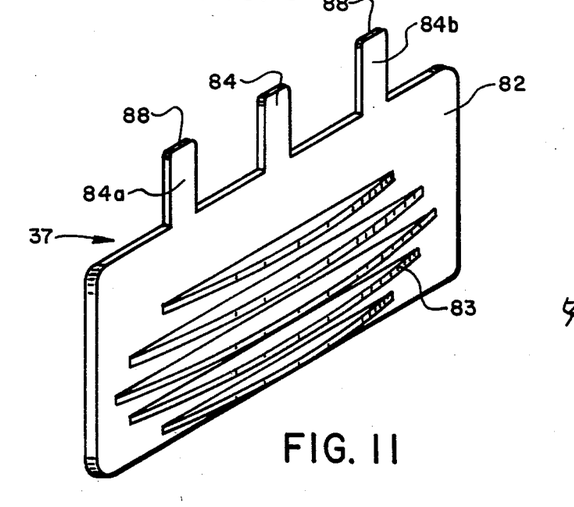
FIG. 11 is an enlarged perspective view of a manually operated key for unlocking the slide lock mechanism of the improved cassette packages of FIGS. 3 and 7.

In accordance with one of the features of the invention, a locking device indicated generally at 35, is slidably mounted on cassette housings 5 and 25 of packages 1 and 20 for locking a cassette 3 in storage compartments 11 and 21 until the cassette is removed by a sales clerk by use of a manually actuated key indicated generally at 37, shown in FIG. 11. The locking device 35 is similar for both packages 1 and 20 and therefore is described in detail with reference to both packages.

Locking device 35 is shown particularly in FIGS. 3, 5, 7 and 13. Locking device 35 includes a slide plate 38 having a plurality of right angle cutouts 39 formed in the top thereof for injection molding a pair of locking levers 40 and 41 on the bottom surface thereof. The top surface 42 of slide plate 38 is relatively flat as is bottom surface 43 shown in FIG. 13. Locking levers 40 and 41 have a generally rectangular configuration and are molded integrally with bottom slide plate surface 43 at diagonally opposite fixed ends 44 and 45 respectively. Levers 40 and 41 are secured and molded to surface 43 by reinforcing cylinders 46 and 47, respectively.

Figure 13:
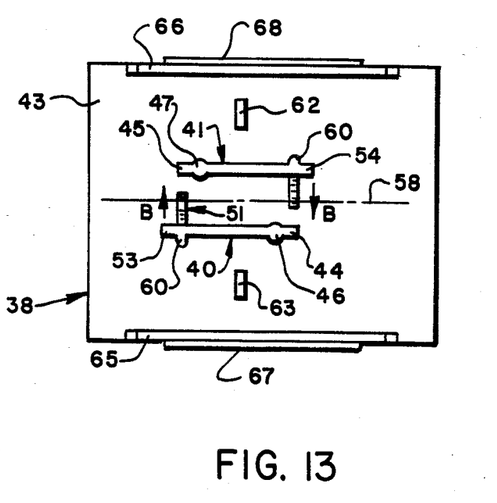
FIG. 13 is a plan view of the bottom surface of the locking slide removed from the cassette package.
Figure 15:
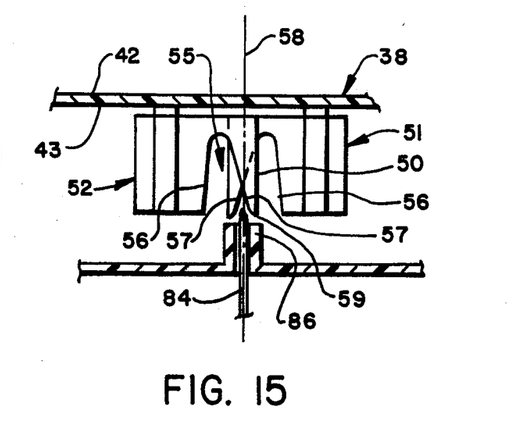
FIG. 15 is a greatly enlarged fragmentary sectional view taken on line 15—15, FIG. 14.
Figure 16:
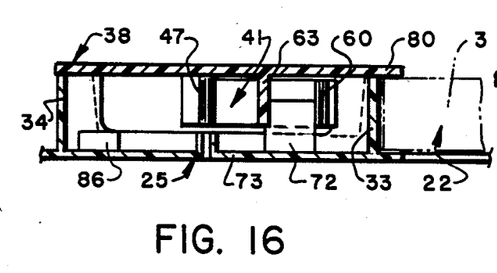
FIG. 16 is an enlarged fragmentary sectional view taken on line 16—16, FIG. 7 with the slide lock being shown in locked position.
Figure 17:
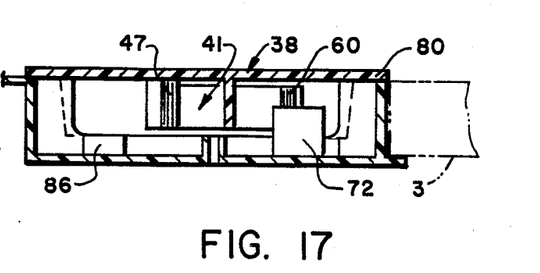
FIG. 17 is a sectional view similar to FIG. 16, but with the slide lock being shown in unlocked position.

Camming projections 51 and 52 are formed on the swinging ends 53 and 54 of levers 40 and 41, respectively. The camming projections are similar to each other and are shown in detail in FIGS. 15 and 18. Each camming projection includes a V-shaped notch 55 formed by inwardly extending walls 56 and 57. In accordance with one of the main features, the two notches 55 of camming projections 51 and 52 are in general alignment with each other as shown in FIGS. 13 and 15, whereby an imaginary plane 58 extending vertically through slide plate 38 will engage the top portions of each camming surface 57 of camming projections 51 and 52 adjacent peaks 59 formed by camming surfaces 57 and vertical projection forming surfaces 50. It is this arrangement which enables key 37 to disengage locking device 35 from its locked position with the cassette housing. A locking nub 60 is molded integrally on the swinging end of each lever 40 and 41 adjacent camming projections 51 and 52. A pair of stop posts 62 and 63 also are molded integrally on bottom slide plate surface 43 and project outwardly therefrom for engaging projections provided on a table top mounted unlocking device indicated generally at 75 and shown in FIGS. 19-21, and described in greater detail below.

Figure 3:
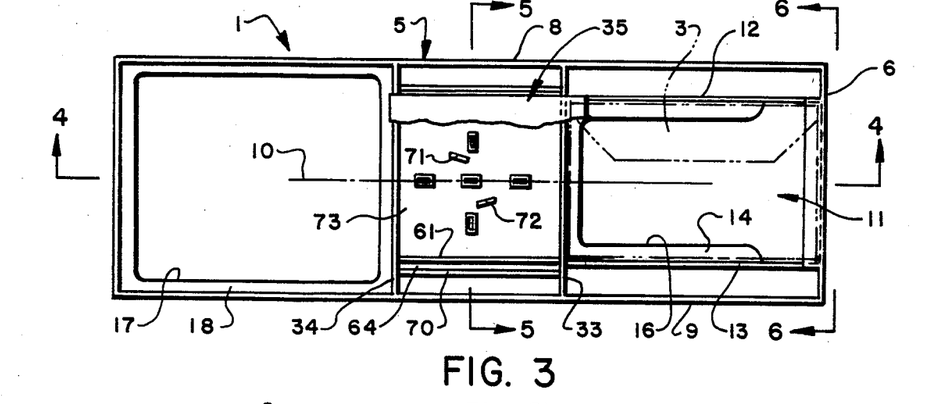
FIG. 3 is a top plan view of the cassette package of the type shown in FIG. 2 removed from the storage case with parts of the slide lock being shown broken away, and with an audio cassette shown in dot dash lines in the storage compartment.
Figure 4:
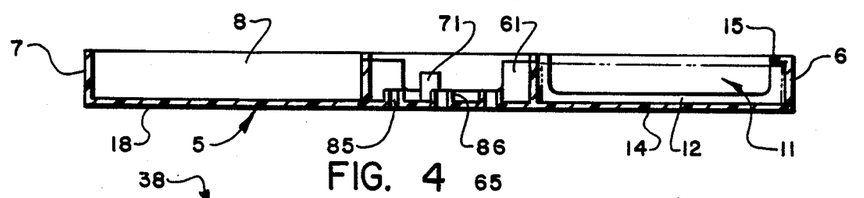
FIG. 4 is a longitudinal sectional view of the cassette package taken on line 4—4, FIG. 3.
Figure 5:
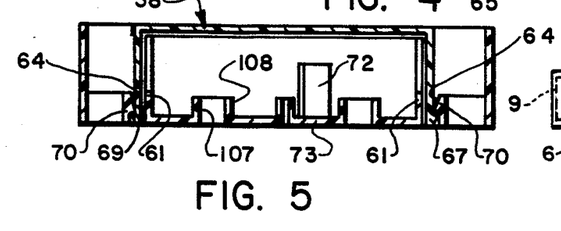
FIG. 5 is an enlarged sectional view taken on line 5—5.
Figure 6:
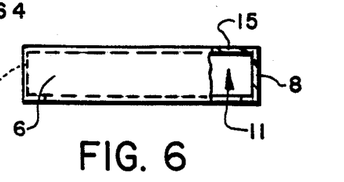
FIG. 6 is an end elevational view with portions broken away and in section, looking in the direction of arrows 6—6, FIG. 3.

Slide plate 38 also includes a pair of slide flanges 65 and 66 which extend perpendicularly outwardly from bottom surface 43 and which extend into a pair of slide channels 64 formed between a pair of walls 61 and slide rails 70 formed on housings 5 and 25 and extending between transverse walls 33 and 34 thereof for slidably mounting slide plate 38 on the housings (FIGS. 3, 5 and 13). A pair of outwardly extending slide tabs 67 and 68 are formed on the bottom edges of slide flanges 65 and 66 (FIGS. 5 and 13) which are engaged with undercuts 69 formed along the bottom edge of slide rails 70.

Figure 12:
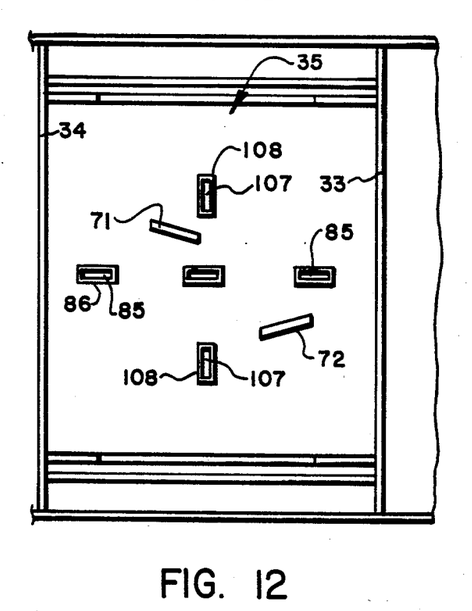
FIG. 12 is an enlarged fragmentary plan view of the central portion of FIG. 3 showing the locking projections formed on the bottom wall of the cassette package.
Figure 14:
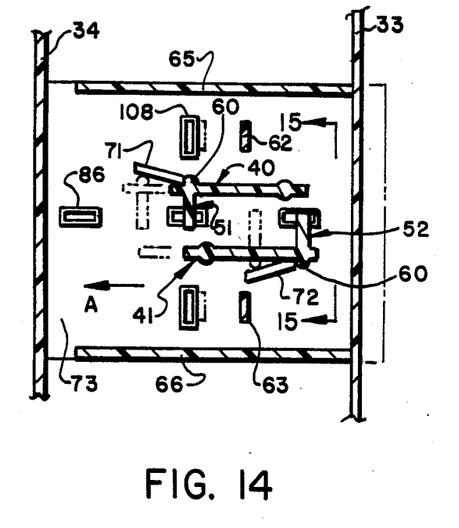
FIG. 14 is an enlarged fragmentary sectional view taken on line 14—14, FIG. 8 showing the locking slide engaged with the locking projections in full line locked position and in dot dash lines in unlocked positions.

A pair of locking projections 71 and 72 are formed on a flat horizontally extending plate 73 which forms part of the bottom wall of housings 5 and 25 and which extends between transverse walls 33 and 34 and slide channel forming walls 61. Projections 71 and 72 are located on opposite sides of axis 10 and are angled with respect to each other as shown in FIGS. 3, 12 and 14. Projections 71 and 72 engage locking nubs 60 mounted on the swinging ends of locking levers 40 and 41 as described in greater detail below.

The operation, features and advantages of improved cassette packages 1 and 20 and in particular the operation of improved locking device 35 is best understood with respect to FIGS. 13-18. Slide plate 38 is slidably mounted on the respective housing by the slide flanges which are engaged with slide rails 70 as discussed above. Slide plate 38 is shown in locked position in full lines in FIGS. 14 and 16, in which position the front edge 80 overlaps the rear end of a cassette 3 contained within storage compartment 21 of housing 25 or within storage compartment 11 of housing 1. When in this forward locking position, locking nubs 60 are engaged with the leading edges of locking projections 71 and 72 (FIG. 14). This engagement prevents movement of slide plate 38 in the direction of arrow A (FIG. 14) and retains front edge 80 in locked engagement with the rear of cassette 3. The front edge of cassette 3 is secured in its respective storage compartments 11 and 21 by housing retaining flanges 15 and 32, respectively. The front edges of slide flanges 65 and 66 engage transverse wall 33 (FIG. 14) limiting the forward movement of the slide plate and locating locking nubs 60 just beyond the forward edges of locking projections 71 and 72. When slide plate 38 is in this forward locking position, cassette 3 is securely retained within its respective storage compartment and unauthorized removal is prevented by slide plate 38. Slide plate 38 cannot be moved in the direction of arrow A (FIG. 14) due to the engagement of locking nubs 60 with projections 71 and 72 until disengaged therefrom by use of key 37.

Key 37 as shown in FIG. 11, includes a relatively flat rectangularly shaped plate 82 provided with a plurality of arcuate shaped outwardly extending stiffening ribs 83 on both sides thereof. Three unlocking fingers 84 are formed integrally with plate 82 and project outwardly from one end thereof. Plate 82, ribs 83 and fingers 84 preferably are integrally molded as a one piece plastic member formed of a high strength polystyrene or similar plastic material.

To unlock nubs 60 from projections 71 and 72, fingers 84 of key 37 are inserted from the underside of the housing through complementary-shaped rectangular openings 85 formed in mounting plate 73 (FIG. 12). Openings 85 are defined by upwardly extending rectangularly shaped projections 86 which also function as guides and retainers for key fingers 84 permitting entrance of fingers 84 into the interior of the respective cassette housing containing the slide plate locking means.

Figure 18:
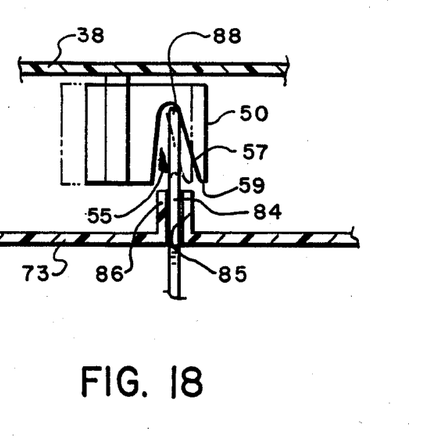
FIG. 18 is an enlarged fragmentary sectional view showing a key finger engaging one of the locking levers of the slide lock for unlocking the same.

In accordance with one of the main features of the invention, the outer tips 88 of key fingers 84 when inserted through openings 85 of projections 86 will engage the top edge of camming wall 57 of both camming projections 51 and 52 as shown particularly in FIGS. 15 and 18. The end two key fingers indicated at 84a and 84b engage camming walls 57 of V-shaped projections 51 and 52 respectively. Continued movement of the locking fingers along walls 57 toward the base of the V-shaped projections will swing the locking levers 40 and 41 inwardly toward each other as shown by arrows B in FIG. 13. This disengages nubs 60 from locking projections 71 and 72 enabling slide plate 38 to be moved manually in the direction of arrows A (FIG. 14) from the full line position to the dot-dash line position. This will remove front slide plate edge 80 from locking engagement with cassette 3 (FIG. 17) enabling the cassette to be removed easily from its stored position within storage compartments 11 or 21.

Figure 19:
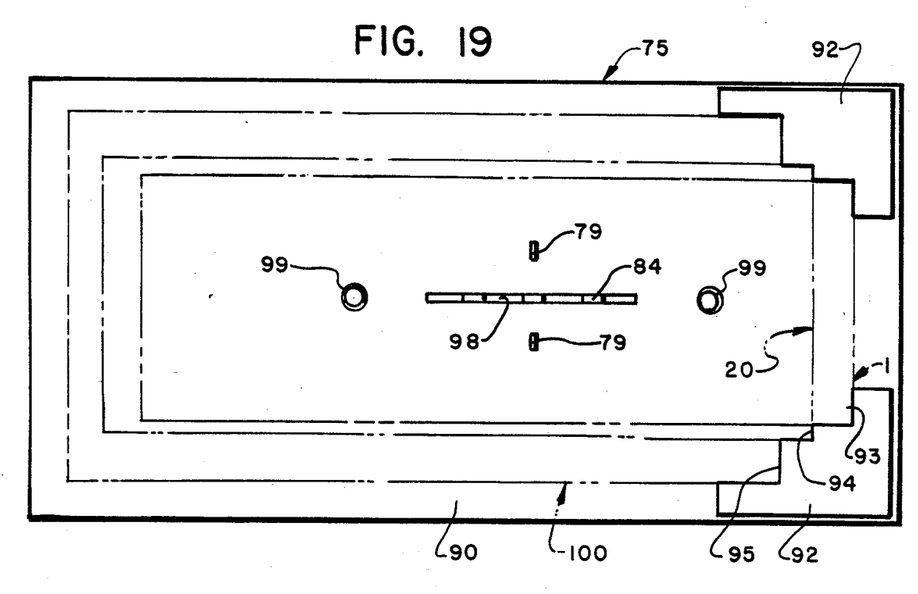
FIG. 19 is a top plan view showing a counter top cassette unloader with three types of the improved cassette package being shown in dot dash lines mounted thereon.
Figure 20:
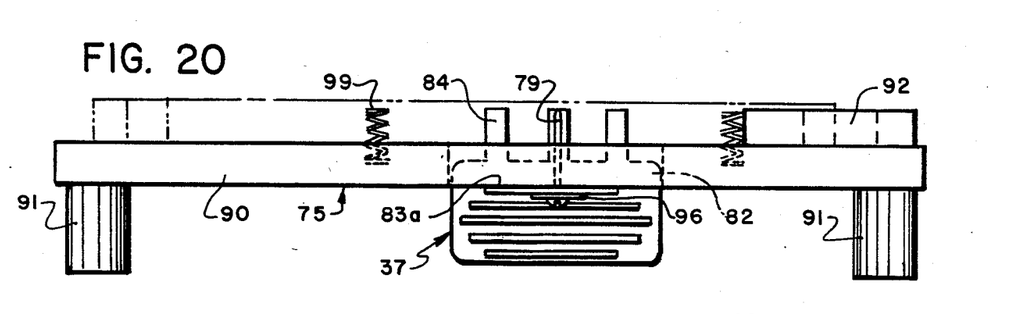
FIG. 20 is a side elevational view of the counter mounted cassette unloader of FIG. 19.
Figure 21:
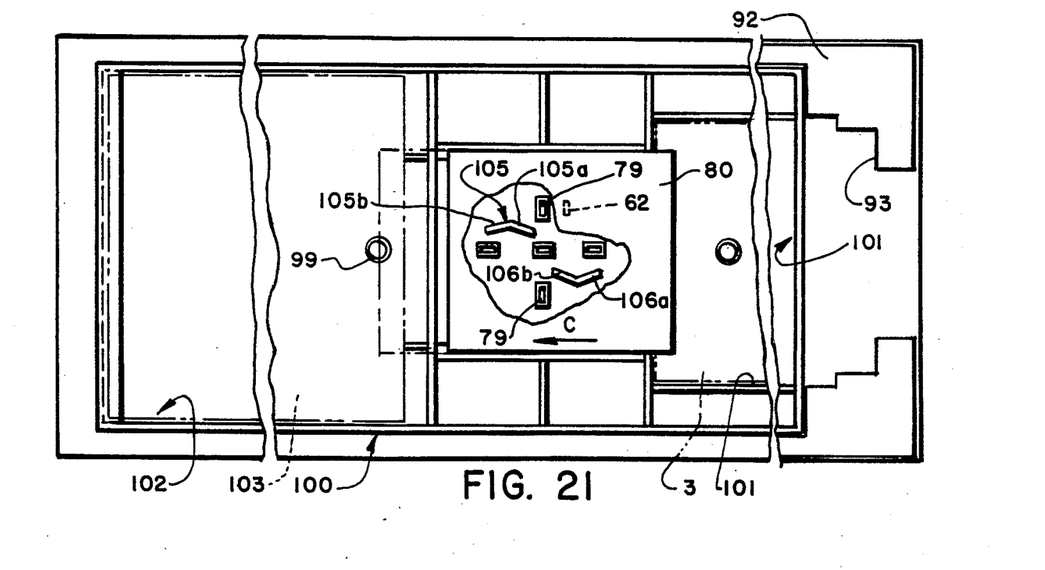
FIG. 21 is a fragmentary top plan view of the counter mounted cassette unloader with the fingers of the unlocking key being shown in section, and with another modified cassette package of the type for holding an audio cassette and a compact disc being mounted on the unloader.

If desired, key 37 may be incorporated into a table top mounted unlocking device 75 to facilitate the removal of cassettes 3 from housings 5 and 25 by a sales clerk as shown in FIGS. 19-21. Unlocking device 75 includes a horizontal platform 90 supported by four-corner legs 91. Legs 91 could be replaced by suction cups if desired, for attaching device 75 on a counter top or similar supporting structure. A pair of template brackets 92 are mounted on the top surface of platform 90 at one end thereof to provide a series of shoulders or cut-outs 93, 94 and 95 for accommodating three different sized cassette packages 1, 20 and 100. Key 37 is mounted beneath platform 90 by an eccentrically mounted retaining washer 96 which engages one of the stiffening ribs 83a for securing key 37 thereon. Key plate 82 is inserted into a slot 98 formed in table platform 90 whereby fingers 84 project above the top surface of platform 90 as shown in FIGS. 19 and 20. A pair of spaced projections 79 also are embedded in platform 90 and project upwardly therefrom as shown in FIGS. 19 and 20 and are spaced transversely with respect to the alignment of key fingers 84. A pair of coil springs 99 are mounted on platform 90 and project upwardly therefrom on opposite sides of key fingers 84.

Bracket shoulders 93-95 are sized to accommodate cassettes 1, 20 and 100 respectively as shown by dot-dash lines in FIG. 19. Shoulders 93-95 are so arranged whereby a cassette package when abutted against its respective bracket shoulder and pressed downwardly against platform 90 will enable key fingers 84 to project upwardly through the housing bottom wall openings 85 and engage locking levers 40 and 41. As described above, this action will move locking nubs 60 out of engagement with locking projections 71 and 72 enabling a sales clerk to move slide plate 38 in the direction of arrow C, FIG. 21 to disengage the locking end 80 of plate 38 from cassette 3 contained in the storage compartment. Upon retraction of slide plate 38 coil spring 99 will automatically eject cassette 3 upwardly from its storage compartment enabling the sales clerk to grasp it and remove it for presentation to the purchaser thereof. This facilitates considerably the manual unlocking of slide lock 38 in contrast to using key 37 when unsupported by platform 90. This also enables the sales clerk's hands to be free for loading another cassette in the empty storage compartment followed by the movement of slide plate 38 in an opposite direction to arrow C, FIG. 21.

Modified cassette package 100 is similar in most respects to cassette packages 1 and 20 and is shown generally in FIG. 21. Modified package 100 has a usual cassette storage compartment 101 at one end thereof similar to storage compartment 21 of package 20, and further includes a compact disc storage compartment 102 formed in the opposite end thereof. To accommodate the compact storage disc compartment, cassette 20 will have an overall length of 12 inches, a width of 6 inches and a depth of 0.8 inches. The only difference between the size of package 100 and packages 1 and 20 is the width of the package to accommodate the compact disc indicated at 103 and shown in dot-dash lines in FIG. 21.

Slide plate 38 functions in the same manner on package 100 as with packages 1 and 20 discussed above except that it also is used to lock a compact disc 103 in storage compartment 102. The only difference in the locking device of package 100 is the formation of the pair of locking projections 105 and 106 on mounting plate 73 having V-shaped configurations as shown in FIG. 21. With this arrangement, end portions 105a and 106a engage lever locking nubs 60 when slide plate 38 is in the locked position with an audio cassette 3 as shown in full lines in FIG. 21, with the opposite end portions 105b and 106b engaging locking nub 60 in the same manner as discussed in detail above with respect to packages 1 and 20, when slide plate 38 is in the compact disc locking position as shown by dot-dash lines in FIG. 21. Thus, package 100 is adaptable for use both for storing an audio cassette 3 and a compact disc 103 by the particular direction of movement of slide plate 38. It will hold either a cassette 3 or compact disc 103 at one time since when slide plate 38 is in one locked position the other storage compartment will be unlocked and unable to retain the cassette or compact disc. However, this provides versatility to the use of the improved cassette package not believed possible with prior packages.

Transversely situated projections 79 formed on platform 90 of table top key device 75 are used with modified compact disc storage package 100. Projections 79 will engage stop posts 62 and 63 formed on slide plate 38 upon plate 38 reaching its unlocked position. This prevents the slide from completely moving to the opposite side of its slide track and into locked position with the other storage compartment requiring a subsequent unlocking before returning it to the neutral position. This facilitates the loading of modified package 100 with either a compact disc 103 or audio cassette 3. For example, assume that cassette package 100 is mounted on platform 90 and slide plate 38 is moved from its locked position as shown in full lines in FIG. 21 to a neutral position. In this neutral position both slide plate edges 80 and 80a will be removed from extending above storage compartments 101 and 102 and stop posts 62 and 63 will engage table top projections 79 enabling a cassette 3 to be loaded in storage compartment 100. This eliminates the possibility of slide 38 being moved too far in the direction of arrow C into locked position with compact disc storage compartment 102. Thus slide lock 38 is always maintained in a neutral position when moved from a locked position to an unlocked position with respect to storage compartment 100.

This same procedure is applicable when loading and unloading a compact disc 103 into and from storage compartment 102. In this particular operation, stop posts 62 and 63 will be on the left-hand side of platform projections 79 in contrast to the right-hand side as shown in FIG. 21 and will abut when slide lock 38 is moved from the locked position with respect to storage compartment 103 to a neutral position for loading and unloading a compact disc therein. Platform projections 79 will extend through openings 107 formed by rectangular-shaped projections 108 as shown particularly in FIG. 12. Cassette packages 1 and 20 need not be formed with rectangular openings 107 and projections 108 as shown in FIGS. 3 and 12 since there is no need to maintain slide lock 38 in a neutral position when no compact disc storage compartment is provided in the housing. Locking projections 71 and 72 will have a single leg in contrast to the V-shaped locking projections 105 and 106 of cassette package 100. However, projections 108 and openings 107 are shown in cassette package 1 and 20 for illustrative purposes and may be formed therein enabling the same molding dies to be used for all three package configurations reducing molding costs.

Thus, improved cassette packages 1, 20 and 100 provide a reusable package for storing audio cassettes either in a vertical upstanding position or in a flat horizontal vertically stacked position enabling prospective purchasers to easily view the contents of the cassette without removing the same from the package, and in which the package prevents theft of the relatively smaller audio cassettes. Another advantage is that the packages are formed of two molded parts, a housing and slide lock which are snapped together to make a permanently attached unit, in which the locking mechanism can only be unlocked by a sales clerk having access to a key, which key may be manually operated or mounted on a table mounted unlocking device to facilitate the loading and unloading of the packages. Another advantage is the use of the modified package 100 either for storage of an audio cassette or a compact disc without substantial modification to the construction and operation of the package.

Accordingly, the improved audio cassette package is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved audio cassette package is constructed and used, the characteristics of the construction, and the advantageous, new and useful results obtained; the new and useful structures, devices, elements, arrangements, parts, and combinations, are set forth in the appended claims.

What is claimed is:

1. A package construction for holding an audio cassette, said construction including:
   (a) an integral one-piece plastic housing having a cassette storage compartment formed therein, said compartment having an access opening for inserting and removing a cassette into and out of said compartment;
   (b) lock means including a slide plate slidably mounted on the housing and movable across the access opening between locked and unlocked positions, respectively, for releasably securing a cassette in the compartment, said slide plate having at least one lever formed thereon;
   (c) projection means formed on the housing for projecting within said housing being located and configured to engage the lever for retaining the slide plate in the lock position to secure a cassette in the storage compartment; and
   (d) separate key means engageable with the slide plate lever for moving said lever out of engagement with the projection means enabling the slide plate to be moved from the locked position to the unlocked position for removing a cassette from the storage compartment.

2. The package construction defined in claim 1, in which opening means is formed in the housing adjacent the projection means, said key means being insertable into the opening means and into engagement with the lever when the lock means is in locked position to disengage the lever from the projection means enabling the slide plate to be moved from the locked position to the unlocked position.

3. The package construction defined in claim 2, in which the projection means includes a pair of spaced projections formed on the housing and projecting toward the interior thereof and extending in an angular relationship toward each other; in which a pair of levers is formed on the slide plate, said levers being located to engage with the pair of projections for retaining the slide plate in locked position with a stored cassette.

4. The package construction defined in claim 3, in which each of the slide plate levers is formed with a camming surface adjacent the swinging end thereof; and in which said camming surfaces are located to engage with the key means for swinging the levers out of locking engagement with the pair of housing projections.

5. The package construction defined in claim 4, in which the swinging end of each of the locking levers is located to engage with a respective one of the locking projections to secure the slide plate in locked position; in which the fixed end of each lever is located adjacent the swinging end of the other lever; and in which said levers extend generally parallel to each other in the direction of movement of the slide plate.

6. The package construction defined in claim 5 in which each of the camming surfaces is an angled surface formed on the lever adjacent the swinging end thereof; in which said angled surfaces are offset with respect to the longitudinal axis of the levers and are located between the spaced parallel levers in alignment with each other; and in which the key means includes finger means which engage the angled camming surfaces and move the swinging ends of the levers inwardly toward each other to disengage the levers from locking engagement with locking projections of the slide plate.

7. The package construction defined in claim 6, in which a nub is formed on the swinging end of each of the levers for engagement with the locking projections on the housing to secure the slide plate in locked position.

8. The package construction defined in claim 6, in which stop means is formed on the slide plate for engagement with abutment means formed on the housing for locating the slide plate in the unlocked position.

9. The package construction defined in claim 6, in which the housing opening means includes at least a pair of spaced holes located between the spaced locking projections; and in which the finger means includes at least a pair of fingers adapted to extend through the pair of housing openings for engagement with the camming surfaces of the levers.

10. The package construction defined in claim 3, in which the slide plate includes a top wall with the locking levers being mounted on an inner surface thereof, and in which a pair of flanges extend from said top wall and are engaged in a pair of spaced slide channels formed in the housing for slidably mounting the slide plate on said housing.

11. The package construction defined in claim 3, in which the cassette storage compartment has an elongated rectangular configuration complementary to the shape and size of an audio cassette and is located at one end of the housing and is formed by a plurality of spaced walls; and in which the longitudinal axis of the compartment is in alignment with the direction of movement of the slide lock.

12. The package construction defined in claim 11, in which the housing has a rectangular configuration having an approximate size of $4.0 \times 0.8 \times 12$ inches.

13. The package construction defined in claim 12 in which the cassette storage compartment has a length of 4.25 inches and a width of 2.8 inches.

14. The package construction defined in claim 3, in which the cassette storage compartment has an elongated rectangular configuration complementary to the shape and size of an audio cassette and is located at one end of the housing and is formed by a plurality of spaced walls; and in which the longitudinal axis of the compartment is transverse to the direction of movement of the slide lock.

15. The package construction defined in claim 14, in which the housing has a rectangular configuration having an approximate size of $4.5 \times 0.8 \times 12$ inches.

16. The package construction defined in claim 1, in which the housing has an elongated rectangular configuration; in which the cassette storage compartment is formed at one end of the housing and a compact audio disc storage compartment is formed at an opposite end of the housing; and in which the slide plate is located between the cassette and disc storage compartments and is slidably movable to selectively lock a cassette or a compact disc in its respective storage compartment.

17. The package construction defined in claim 16, in which the housing has an approximate size of 6.0×0.8×12.0 inches.

18. The package construction defined in claim 1, in which a pair of V-shaped projections is formed on the interior of the housing and are spaced transversely and longitudinally with respect to each other; in which a pair of spaced locking levers is mounted on the slide plate and are located to engage with the V-shaped housing projections to secure the slide plate in locked position; and in which a plurality of holes are formed in the housing adjacent the V-shaped projections; and in which the means is adapted to extend through the holes and engage the levers for moving said levers out of locking engagement with the V-shaped projections.

19. The package construction defined in claim 1 in which the key means is mounted in a holder adapted to be placed on a supporting structure; in which said holder has a horizontal base with the key means projecting upwardly from the base and located to engage the lock means to unlock the lock means of a package placed on said base; and in which spring means is mounted on the base and located for automatically ejecting a cassette from the storage compartment upon the package being placed on the base with the key means engaging and unlocking the lock means and said lock means being moved manually to the unlocked position.

20. The package construction defined in claim 19, in which a slot is formed in the base; and in which the key means is mounted on the base; and includes fingers which extend through the slot and upwardly from the base and located to engage the lock means of a package when placed on the base.

21. The package construction defined in claim 19 in which guide means is mounted on the base and located to position the package thereon to align the key means with the lock means when a package is placed on said base.

22. The package construction defined in claim 1 in which the key means is formed of plastic and includes a relatively flat plate having a plurality of fingers projecting outwardly from one end thereof; and in which reinforcing ribs are formed on the plate to provide strength and a hand gripping surface therefor.

23. A package construction for holding an object, said construction including:
(a) an integral one-piece plastic housing having a storage compartment formed therein, said compartment having an access opening for inserting and removing an object into and out of said compartment.
(b) lock means including a slide plate slidably mounted on the housing and movable across of the access opening between locked and unlocked positions, respectively, for releasably securing an object in the compartment, said slide plate having at least one lever formed thereon;
(c) projection means formed on the housing for projecting within said housing being located and configured to engage the lever for retaining the slide plate in the locked position to secure an object in the storage compartment; and
(d) separate key means engageable with the projection means for moving said lever out of engagement with the projection means enabling the slide plate to be moved from the locked position to the unlocked position for removing an object from the compartment.

24. The package construction defined in claim 23 in which opening means is formed in the housing adjacent the projection means, said key means being insertable into the opening means and into engagement with the lever when the lock means is in locked position to disengage the lever from the projection means enabling the slide plate to be moved from the locked position to the unlocked position.

25. The package construction defined in claim 24 in which the projection means includes a pair of spaced projections formed on the housing and projecting toward the interior thereof and extending in an angular relationship toward each other; in which a pair of levers is formed on the slide plate, said levers being located to engage with the pair of projections for retaining the slide plate in locked position with a stored cassette.

26. The package construction defined in claim 25 in which each of the slide plate levers is formed with a camming surface adjacent the swinging end thereof; and in which said camming surfaces are located to engage with the key means for swinging the levers out of locking engagement with the pair of housing projections.

27. The package construction defined in claim 26 in which the swinging end of each of the locking levers is located to engage with a respective one of the locking projections to secure the slide plate in locked position; in which the fixed end of each lever is located adjacent the swinging end of the other lever; and in which said levers extend generally parallel to each other in the direction of movement of the slide plate.

28. A device having integrated key means for holding and removing an object from a package, said device having a horizontal base with the key means projecting upwardly from the base and located and oriented to engage a locking and manually moveable means of a package when said package is placed on said base to unlock said locking and manually moveable means to remove an object from the package; and spring means for biasing said object away from said horizontal base mounted on the base and located for automatically ejecting an object from a storage compartment of the package upon the package being unlocked by said key means.

29. The device defined in claim 28 in which a slot is formed in the base; and in which the key means is mounted on the base and includes fingers which extend through the slot and upwardly from the base and are located to engage the locking and manually moveable means of a package when placed on the base.

30. The device defined in claim 28 in which a guide means is mounted on the base and located to position the package thereon to align the key means with the locking and manually moveable means when a package is placed on said base.

31. The device defined in claim 28 in which the key means is formed of plastic and includes a relatively flat plate having a plurality of fingers projecting outwardly from one end thereof; and in which reinforcing ribs are formed on the plate to provide strength and a hand gripping surface therefor.

* * * * *

REEXAMINATION CERTIFICATE (2335th)

United States Patent [19]

Hehn

[11] B1 4,589,549

[45] Certificate Issued Jul. 12, 1994

[54] AUDIO CASSETTE PACKAGE

[75] Inventor: Bruce A. Hehn, Canton, Ohio

[73] Assignee: Alpha Enterprises, Inc., Canton, Ohio

Reexamination Request:
No. 90/003,237, Nov. 1, 1993

Reexamination Certificate for:
Patent No.: 4,589,549
Issued: May 20, 1986
Appl. No.: 590,717
Filed: Mar. 19, 1984

[51] Int. Cl.⁵ .................................... B65D 85/672
[52] U.S. Cl. ................................. 206/387; 70/63; 70/401; 70/408; 206/1.5
[58] Field of Search ............... 70/58, 63, 69, 401, 70/408; 40/330; 206/1.5, 387, 807

[56] References Cited

U.S. PATENT DOCUMENTS

| | | | |
|---|---|---|---|
| D. 329,594 | 9/1992 | Gregerson et al. | D9/341 |
| 344,126 | 6/1886 | Meaker . | |
| 2,293,942 | 8/1942 | Klahn | 70/63 |
| 2,672,747 | 3/1954 | Craig | 70/406 |
| 3,125,873 | 3/1964 | Robinson | 70/63 |
| 3,272,325 | 9/1966 | Schoenmakers | 206/52 |
| 3,504,652 | 4/1970 | Norman, Jr. | 116/114 |
| 3,638,788 | 2/1972 | Solomon | 206/52 R |
| 3,700,098 | 10/1972 | Posso | 206/52 F |
| 3,722,236 | 3/1973 | Zelenko | 70/78 |
| 3,736,777 | 6/1973 | Wirth | 70/63 |
| 3,746,180 | 7/1973 | Spiroch et al. | 211/113 |
| 3,776,374 | 12/1973 | Medendorp | 206/45.14 |
| 3,828,922 | 8/1974 | Holkestad | 206/1.5 |
| 3,871,516 | 3/1975 | Holkestad et al. | 206/45.31 |
| 3,933,240 | 1/1976 | Humble | 206/1.5 |
| 3,994,395 | 11/1976 | Bennett-Robertson | 206/387 |
| 4,047,410 | 9/1977 | Close | 70/62 |
| 4,105,112 | 8/1978 | Graf | 206/1.5 |
| 4,125,189 | 11/1978 | Fujimoto et al. | 206/387 |
| 4,187,703 | 2/1980 | Ippoliti et al. | 70/63 |
| 4,240,551 | 12/1980 | Osanai | 206/387 |
| 4,243,142 | 1/1981 | Foreman | 206/387 |
| 4,245,741 | 1/1981 | Holkestad | 206/387 |
| 4,285,429 | 8/1981 | MacTavish | 206/387 |
| 4,299,870 | 11/1981 | Humble | 428/101 |
| 4,303,159 | 12/1981 | Stone et al. | 206/387 |
| 4,327,952 | 5/1982 | Cournoyer et al. | 312/184 |
| 4,361,233 | 11/1982 | Holkestad | 206/387 |
| 4,365,712 | 12/1982 | Oishi et al. | 206/387 |
| 4,366,915 | 1/1983 | Seidler | 220/339 |
| 4,381,836 | 5/1983 | Rivkin et al. | 206/387 |
| 4,385,693 | 5/1983 | Gelardi et al. | 206/387 |
| 4,466,540 | 8/1984 | Lotrous et al. | 206/387 |
| 4,558,782 | 12/1985 | Iverson et al. | 206/387 |
| 4,628,713 | 12/1986 | Cecchi et al. | 70/58 |
| 4,634,004 | 1/1987 | Mortensen | 206/387 |
| 4,759,442 | 7/1988 | Gregerson et al. | 206/387 |
| 4,865,190 | 9/1989 | Gregerson et al. | 206/309 |
| 5,129,244 | 7/1992 | Wittman | 70/57.1 |

OTHER PUBLICATIONS

The Illustrated Science & Invention Encyclopedia, pp. 1389-1391, no date.

Locks and Keys Throughout the Ages, V. J. M. Eras, (1957), pp. 8, 21, 26, 44-45, 47.

Primitive Locks and Keys, Pitt-Rivers, F. R. S. (1883), Plates III through X.

The Lure of the Lock, Hopkins, Albert A., (1928), pp. 92, 100-101.

Early Locks and Lockmakers of America, T. F. Hennessy (1976), pp. 2, 88, 124-125, 127-128.

*Primary Examiner*—Jimmy G. Foster

[57] ABSTRACT

A reusable molded plastic package for holding audio cassettes which enables the cassettes to be stored and displayed in racks heretofore used for record discs and eight-track audio tapes and which includes a slide lock which secures the cassette in the package preventing its unauthorized removal therefrom. In one embodiment, the cassette is mounted in a transverse position at one end of the package enabling the contents of the cassette to be viewed from the end of the package when stored in a horizontal position. In another embodiment, the cassette is mounted in a longitudinal position at one end of the cassette whereby the contents can be read from the front of the cassette when stored in a vertical position. In still another embodiment the package can store either an audio cassette or a compact disc. The slide lock is retracted from its locked position by a manually operated key. The key engages camming surfaces formed on the swinging ends of a pair of locking levers formed on the slide lock enabling the levers to be moved from their locked position with a pair of angled projections formed on the interior of the housing.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 28-31 is confirmed.

Claims 1 and 23 are determined to be patentable as amended.

Claims 2-22 and 24-27, dependent on an amended claim, are determined to be patentable.

New claim 32 is added and determined to be patentable.

1. A package construction for holding an audio cassette, said construction including:
   (a) an integral one-piece plastic housing having a cassette storage compartment formed therein *at one end thereof*, said compartment having an access opening for inserting and removing a cassette into and out of said compartment;
   (b) lock means including a slide plate slidably mounted on the housing [and movable] *to move from an unlocked position to a locked position only partially* across the access opening *beyond which the plate is unable to move, said locked position being* [between locked and unlocked positions, respectively,] for releasably securing a cassette in the compartment, said slide plate having at least one lever formed thereon;
   (c) projection means formed on the housing for projecting within said housing being located and configured to engage the lever for retaining the slide plate in the [lock] *locked* position to secure a cassette in the storage compartment; [and]
   (d) *said cassette storage compartment being defined by a pair of spaced sidewalls, a pair of spaced end walls, a bottom wall, and a flange formed on one of the end walls and extending toward the slide plate and access opening for engaging an edge of the cassette when inserted in said storage compartment for releasably securing the cassette in the compartment in cooperation with the slide plate in the locked position in which the slide plate is adapted to engage an opposite edge of the cassette in the locked position; and*
   (e) separate key means engageable with the slide plate lever for moving said lever out of engagement with the projection means enabling the slide plate to be moved from the locked position to the unlocked position for removing a cassette from the storage compartment.

23. A package construction for holding an object, said construction including:
   (a) an integral one-piece plastic housing having [a] *an object* storage compartment formed therein *at one end thereof*, said compartment having an access opening for inserting and removing an object into and out of said compartment;
   (b) lock means including a slide plate slidably mounted on the housing [and movable] *to move from an unlocked position to a locked position only partially* across [of] the access opening [between locked and unlocked positions, respectively,] *beyond which the plate is unable to move, said locked position being* for releasably securing an object in the compartment, said slide plate having at least one lever formed thereon;
   (c) projection means formed on the housing for projecting within said housing being located and configured to engage the lever for retaining the slide plate in the locked position to secure an object in the storage compartment; [and]
   (d) *said object storage compartment being defined by a pair of spaced sidewalls, a pair of spaced end walls, a bottom wall, and a flange formed on one of the end walls and extending toward the slide plate and access opening for engaging an edge of the object when inserted in said storage compartment for releasably securing the object in the compartment in cooperation with the slide plate in the locked position in which the slide plate is adapted to engage an opposite edge of the object in the locked position; and*
   (e) separate key means engageable with the projection means for moving said lever out of engagement with the projection means enabling the slide plate to be moved from the locked position to the unlocked position for removing an object from the compartment.

32. *A package construction for holding an audio cassette, said construction including:*
   (a) *an integral one-piece plastic housing having a lock compartment and a cassette storage compartment formed therein, said lock compartment being separated from the storage compartment by a partition, said storage compartment having an access opening for inserting and removing a cassette into and out of said storage compartment;*
   (b) *lock means including a slide plate slidably mounted on the housing and movable across the partition and the access opening when moving between locked and unlocked positions for releasably securing a cassette in the storage compartment, said slide plate having at least one lever formed thereof;*
   (c) *projection means formed on the housing for projecting within said housing being located and configured to engage the lever for retaining the slide plate in the locked position to secure a cassette in the storage compartment; and*
   (d) *separate key means engageable with the slide plate lever for moving said lever out of engagement with the projection means enabling the slide plate to be moved from the locked position to the unlocked position for removing a cassette from the storage compartment.*

* * * * *